US007339774B2

(12) United States Patent
Zdziech et al.

(10) Patent No.: US 7,339,774 B2
(45) Date of Patent: Mar. 4, 2008

(54) AUTOMATIC BATTERY DISCONNECT SYSTEM

(76) Inventors: Peter M. Zdziech, 48 Matthews Rd., Newark, DE (US) 19713; John Richard Walls, III, 45 Upland Ct., Newark, DE (US) 19713

( * ) Notice: Subject to any disclaimer, the term of this patent is extended or adjusted under 35 U.S.C. 154(b) by 182 days.

(21) Appl. No.: 11/014,129

(22) Filed: Dec. 16, 2004

(65) Prior Publication Data

US 2005/0093371 A1 May 5, 2005

Related U.S. Application Data

(63) Continuation-in-part of application No. 10/008,666, filed on Nov. 3, 2001, now abandoned.

(60) Provisional application No. 60/245,272, filed on Nov. 3, 2000.

(51) Int. Cl.
*H02H 3/00* (2006.01)
*H02H 7/18* (2006.01)

(52) U.S. Cl. .................................... 361/93.1; 307/10.7

(58) Field of Classification Search ............... 361/93.1; 307/10.1, 10.7

See application file for complete search history.

(56) References Cited

U.S. PATENT DOCUMENTS 3,509,894 A 5/1970 Brooke
4,291,296 A * 9/1981 Seifers ...................... 307/10.3
4,581,504 A 4/1986 Hamel, Sr.
4,798,968 A 1/1989 Deem
4,964,485 A * 10/1990 Miele ........................ 180/275
5,034,620 A 7/1991 Cameron
5,120,617 A * 6/1992 Cameron ...................... 429/7
5,278,452 A * 1/1994 Matsumoto et al. ....... 307/10.8
5,602,371 A 2/1997 Kerns et al.
5,612,659 A * 3/1997 Kerber ....................... 335/177
5,871,858 A 2/1999 Thomsen et al.
5,949,148 A * 9/1999 Wagner ..................... 307/10.1
6,049,140 A * 4/2000 Alksnat et al. ........... 307/10.2
6,625,553 B1 9/2003 Modgil
6,646,845 B1 11/2003 Turner et al.

FOREIGN PATENT DOCUMENTS

DE 3417328 A1 * 11/1985
JP 05236602 A * 9/1993
JP 2001307261 A * 11/2001
JP 2003226208 A * 8/2003

* cited by examiner

*Primary Examiner*—Michael Sherry
*Assistant Examiner*—Boris Benenson
(74) *Attorney, Agent, or Firm*—RatnerPrestia

(57) ABSTRACT

A safety battery disconnect system for disconnecting a vehicle battery from the electrical system of the vehicle when an impact exceeding a predetermined magnitude is detected while maintaining electrical power input from the battery to selected portions of the vehicle electrical system. The system includes a shock sensor connected to a latching switch interposed between the battery and the vehicle fused electrical input system and is preferably a unitary unit mounted on or in close proximity to the battery.

6 Claims, 3 Drawing Sheets

FIG 1
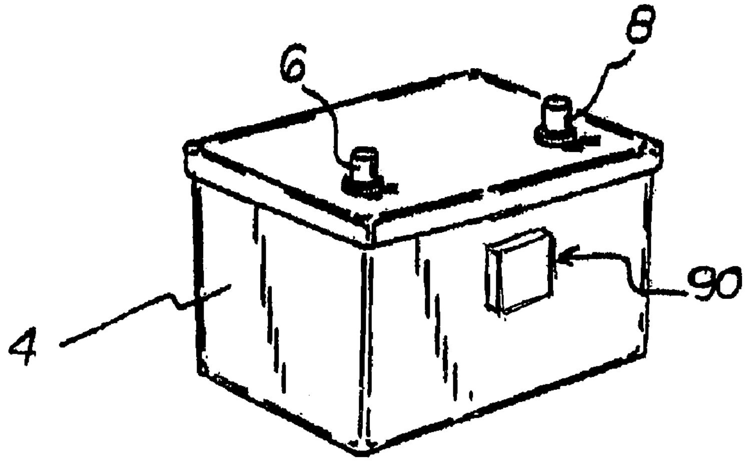
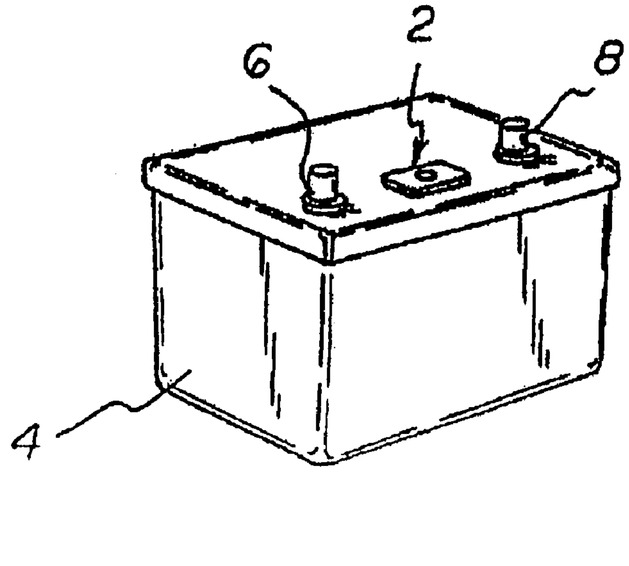
FIG 2

FIG 3
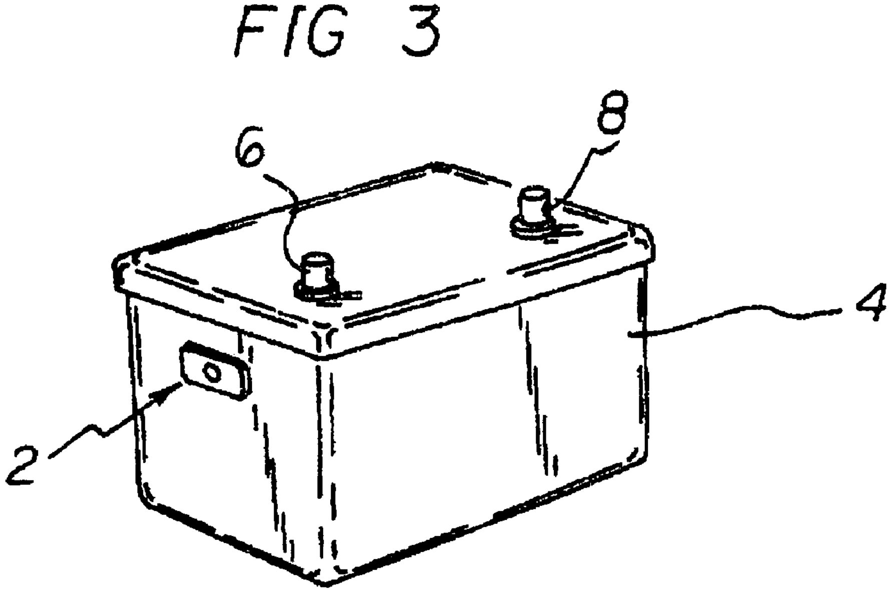
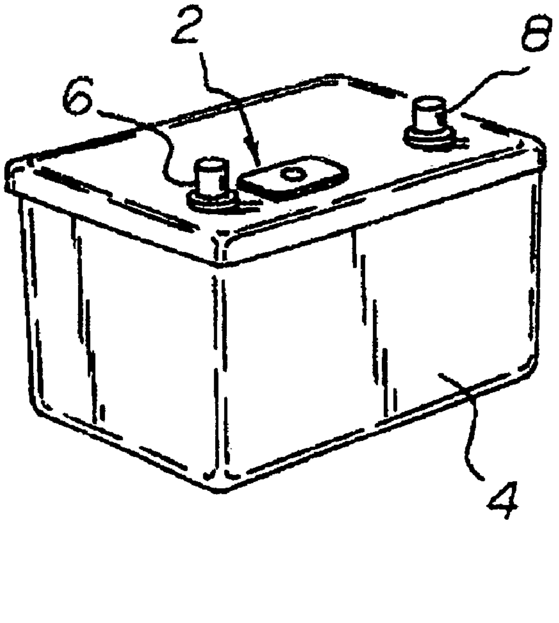
FIG 4

AUTOMATIC BATTERY DISCONNECT SYSTEM

CROSS-REFERENCE TO RELATED APPLICATIONS

This application is a continuation-in-part of application Ser. No. 10/008,666 filed Nov. 3, 2001, now abandoned claiming priority of provisional application Ser. No. 60/245,272 filed on Nov. 3, 2000 both of which are incorporated herein by reference.

FIELD OF THE INVENTION

The invention relates to automotive vehicle safety and more particularly to a battery disconnect system that automatically disconnects a vehicle battery in case of an accident cutting power to non essential systems.

BACKGROUND OF THE INVENTION

Many times, after vehicle accidents, fuel is spilled. When this occurs, the spilled fuel poses a great danger of ignition, especially if power still remains in the vehicle. All it would take would be an accidental spark or contact with a charged part of the vehicle, and the spilled fuel would ignite and cause substantially more damage than an automobile accident alone would create. A number of past attempts to prevent such accidental spark from occurring are known. A number of the proposed solutions include mercury switches wherein mercury is used to form an electrical path between the switch terminals and power is interrupted or restored depending on the angle of the mercury container. It is also known to used an inertia driven sliding block to make or break the connection between terminals. See for example U.S. Pat. No. 5,602,371 issued to Kerns et al. in 1997.

U.S. Pat. No. 5,034,620, issued to Cameron, discloses an emergency cutoff switch for preventing the transmission of electrical current to a vehicle from a battery connected in an electric circuit of the vehicle.

U.S. Pat. No. 4,798,968, issued to Deem, discloses a battery disconnect apparatus for interrupting flow of power through an electrical circuit. U.S. Pat. No. 4,581,504, issued to Hamel, Sr., discloses an electrical cutoff switch in which the circuit is immediately broken by concussive distortion to the unit housing which is secured to a vehicle or aircraft powered by an internal combustion engine utilizing a storage battery as an electrical energy source.

Mercury switches are undesirable because of the danger of mercury spillage in case of an accident. In addition, modern cars have a number of electrically operated elements in addition to the ignition and lights circuits typical of older models. These elements include power locks and power windows. Cutting off all power to a vehicle as done by the type of circuit exemplified by the Kerns et al patent, while providing a measure of protection against accidental fire of spilled fuel due to an electrical spark, presents a new problem. With the windows and door lock now inoperable passengers may be trapped inside the vehicle without the ability to escape.

There is, therefore, still a need for a battery cutoff system that will disengage a vehicle battery from all but a selected number of electrical circuits in the vehicle in case of an accident.

SUMMARY OF THE INVENTION

These needs are addressed by the present invention. In one aspect, the invention comprises a cutoff system for a battery powering a vehicle electrical system, the battery comprising a first terminal connected to the vehicle electrical system and a second terminal identified as a return or ground terminal. The battery cutoff system also comprises a shock detector mounted on the vehicle, adapted to provide a command signal upon detection of an impact generating a pressure change in the detector in excess of about between 55 lbs., and a cutoff switch interposed between the battery first terminal and the vehicle electrical system. The cutoff switch includes a control device connecting the cutoff switch to the shock detector. The control device is adapted to switch the cutoff switch from a first state where the cutoff switch connects the battery first terminal to the vehicle electrical system to a second state where the cutoff switch disconnects the vehicle electrical system from the battery first terminal upon receipt of a command from the shock detector.

It is also within this invention objects to provide a system such as described above where the cutoff switch control and the shock detector both are connected to the battery first terminal on the side of the cutoff switch that is connected to the battery first terminal.

It is also another object of this invention to provide a system such as described above where selected portions of the vehicle electrical system are connected to the battery first terminal bypassing the cutoff switch whereby certain electrical functions of the vehicle electrical system remain operational regardless of the cutoff switch status.

BRIEF DESCRIPTION OF THE DRAWINGS

FIG. 1 shows a perspective view of a battery with a side-mounted circuit breaker mount in an enclosure that includes both the shock sensor and the cutoff control and latchina switch.

FIG. 2 shows a perspective view of a battery with a top-mounted cutoff switch mount located halfway between the positive and negative terminals of the battery.

FIG. 3 shows a perspective view of a battery with a side-mounted cutoff switch mount where the cutoff switch mount would be located on the side closest to the positive terminal of the battery.

FIG. 4 shows a perspective view of a battery with a top-mounted cutoff switch mount located closer to the positive terminal of the battery than to the negative terminal of the battery.

DETAILED DESCRIPTION OF THE INVENTION

The invention will next be described with reference to the figures where same numerals are used to indicate same elements in all figures. Such figures are provided as exemplary embodiments of this invention and are not intended as actual construction drawings. They are not, therefore, reproduced to scale. Furthermore, elements not essential in understanding the invention are not always shown in order to simplify the drawings.

Referring next to FIGS. 1-4, the present invention is that of a new and improved apparatus which cuts power in an automobile immediately after an accident. The apparatus is in effect an electrical cutoff switch 2 connected to the battery 4, with the electrical cutoff switch 2 adapted to automatically cut power to the battery 4 after an accident. By including a cutoff switch 2 in conjunction with the battery 4, the cutoff switch 2 automatically cuts power to the battery 4 after an accident and greatly reduce the chance of a fire starting from any spilled fuel that might be present.

By way of illustration, the cutoff switch is preferably attached to the front surface of a mounting plate, with the mounting plate preferably being a rectangular metal plate having dimensions of two inches in length and one-half to one inch in width. The rear surface of the mounting plate would be placed against the battery to properly mount the cutoff switch 2. The metal mounting plate can be placed in one of a wide variety of locations, depending on the type of battery, size of battery, placement of battery 4 within a vehicle, and the accessibility of various sides of the battery after it had been placed within a vehicle.

The battery 4 has two terminals, a positive terminal 6 and a negative terminal 8. Conventionally and in most cases the negative terminal serves as a system ground, while the positive terminal is connected to an input side of the vehicle electrical system. This input side is usually in the form of a fused power distribution panel, power coming in at one end then being distributed to various vehicle systems through a plurality of fused circuits. Because there are certain systems that operate with a positive ground rather than a negative ground we will refer to the battery terminal connected to the vehicle electrical system as the first terminal and the terminal serving as ground or return path as the second terminal.

Figure 5:
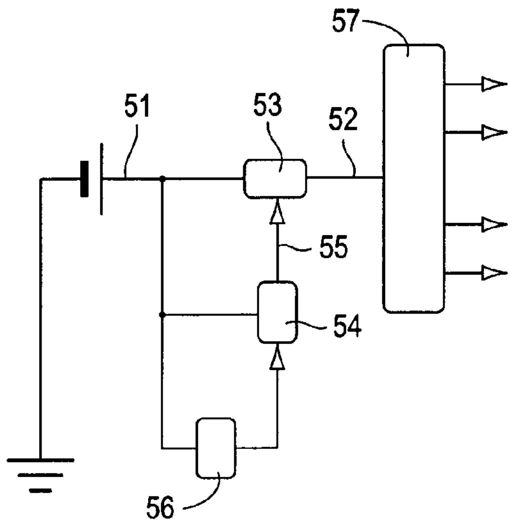
FIG. 5 is a block diagram of an implementation of one embodiment of this invention.

Referring next to FIG. 5, there is shown one embodiment of this invention. The connection between the battery first terminal 51 and the vehicle input connection 52 is interrupted and a latching cutoff switch 53 is interposed. Latching cutoff switches are switches that upon receipt of an actuating command signal switch states and remain in the new state until another signal is received. Latching switches are well known in the art and may be divided into two broad categories. Mechanically latched switches and electrically latched switches. The mechanically latched switches use a solenoid actuator to switch the contacts from a first position to a second position, and require no electrical power to remain in any of the switched positions. The electrically latched switches typically have a normal position where no power is used and an actuated position where electrical power is used to maintain such position. The electrically latching switches may be electromechanical, solenoid driven devices or fully electronic solid state switches. In all cases the switch includes a control circuit portion for receiving a command in response to which the switch switches from a first position and latches to a second position, and a terminal switching portion comprising an input terminal or plurality of terminals, and an output terminal or plurality of terminals. The command may be as simple as the application of an actuating voltage, or as complex as a coded electronic signal, depending on the type of components used.

The control circuit (which may be as simple as a solenoid for actuating the terminals of an electrical switch) is connected to an output terminal of a collision detector mounted on the vehicle and adapted to provide a command upon detection of a predetermined impact magnitude on the vehicle. Collision or shock sensors are also well known in the art, exist in many types and are extensively used in the deployment of safety bags upon detection of a collision. A similar sensor may be used or any other type of sensor able to generate a signal detectable by the control circuit of the latching switch. Thus the sensor may be piezoelectric, electromechanical, or electronic. The particular sensor is not critical and its selection is a matter of matching sensor output with latching switch input.

The connection of the sensor/battery/switch and vehicle system input is also dependent somewhat on the type of switch selected. In one embodiment the cutoff switch is a mechanical latching type, driven to alternate states by an electrically operated actuator such as the zero current draw position holding solenoid actuator made by TLX technologies of Waukesha, Wis.

Returning to FIG. 5, FIG. 5 represents a schematic of how a latching cutoff switch may be connected to vehicle electrical input connection. The cutoff switch 52 is latched in a first CLOSED position and current flows unimpeded between the battery first terminal 51 and the vehicle electrical input 52. The shock sensor 56 is preferably connected to the battery side of the switch 53. When a crash occurs the sensor 56 outputs a signal to cutoff switch control 54. In cases where the latching switch is a mechanical actuated switch, an actuator 55 shifts the switch terminals which mechanically latch in the second, OPEN position cutting off power to the vehicle electrical system 57. If the cutoff switch is electrically operated (using a solenoid or other electrical circuit to maintain a selected state, i.e. OPEN or CLOSED) the switch contacts are held open electrically again cutting power to the vehicle electrical system.

In a preferred embodiment, a double guard shock and impact sensor such as model 504D manufactured by Directed Electronics, Inc. may be used. Such sensor draws less than 1 ma so it has minimal loading on the electrical supply of the vehicle. When activated the sensor outputs a negative voltage that is used to activate a latching master switch. Preferably, the latching master switch is 30 volt model F3 manufactured by American Terminal and comprises two parts. The first part is a relay adapted to receive the negative signal from the impact sensor and actuate the second part, which is the main or master breaker, cutting off the battery output from the rest of the automotive fuse panel. The master breaker is preferably rated at 100 amperes or higher, even though lower amperage may be acceptable depending on the particular circuit that is being interrupted. The preferred master breaker latches mechanically in the open position once tripped by the relay and is reset by a mechanical actuator such as a reset plunger.

Alternatively the reset button may be an electronic reset switch.

Figure 6:
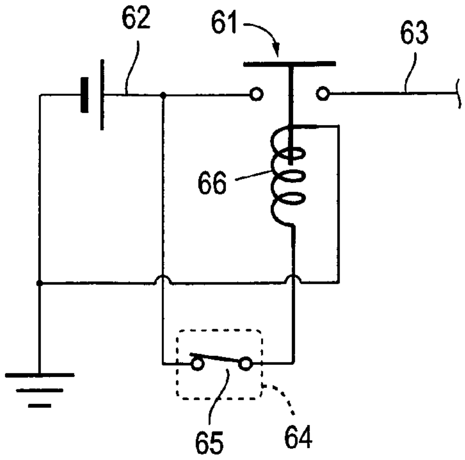
FIG. 6 is a circuit diagram of an implementation of another embodiment of this invention.

FIG. 6 depicts another non limiting, exemplary embodiment of this invention using an electrically latched cutoff switch. In this embodiment, the shock sensor 64 includes a normally closed (NC) contact 65, that opens when a shock of a preselected magnitude is sensed. Shock sensor is preferably non adjustable having been preset at the factory to a particular shock value, but may be adjustable in the sense that the shock magnitude may be selectively set. The particular actuation value selected must be high enough to assure that the sensor does actuate when the vehicle encounters normally expected shocks such as for example produced by the vehicle hitting pot holes in the highway. Typical preferred values are higher than 50 lbs and preferably from about 55 lbs to about 65 lbs, but other values may be chosen depending on the anticipated vehicle use.

When switch 65 opens, current flow in the solenoid 66 is interrupted and cutoff switch 61 which is a NO switch opens, interrupting the connection between the battery output terminal 62 and the vehicle power input terminal 63.

FIG. 6 shows an embodiment using an electromechanical latching switch 61 which is a normally open type and is operated in a closed position permitting flow of current to the vehicle input terminal. The cutoff switch 61 could also be a normally closed switch which opens when current flows in the switch actuating solenoid. In such case, the sensor 64 includes a NO switch 65 and upon detection of a pressure in excess of a preset pressure as previously stated, closes switch 65 providing a current path between the battery terminal and the solenoid 66. Current flow in the solenoid 66 actuates cutoff switch 61 which is a NC switch switching it to an open position, interrupting the current flow to the vehicle system.

Figure 7:
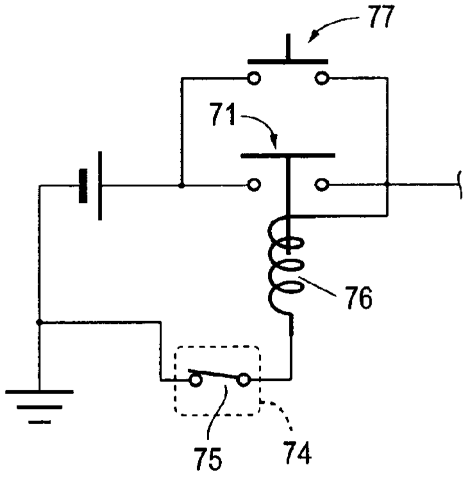
FIG. 7 is a circuit diagram of an implementation of an alternate embodiment of this invention.

In yet another embodiment shown in FIG. 7, the shock sensor 74 may be powered from a connection on the vehicle system side of the latching switch. This embodiment again includes a cutoff switch 71 a control solenoid 76 for operating the cutoff switch 71, a shock sensor 74 with a NC switch 75 and input and output cutoff switch connections 72 and 73 connected to the battery and vehicle electrical system respectively. When the sensor 74 is so connected and the cutoff switch 71 is a NO type, a momentary closure switch 77 may be provided to power the solenoid and close switch 71 thereby to initialize the system upon installation or following a power interruption.

Figure 8:
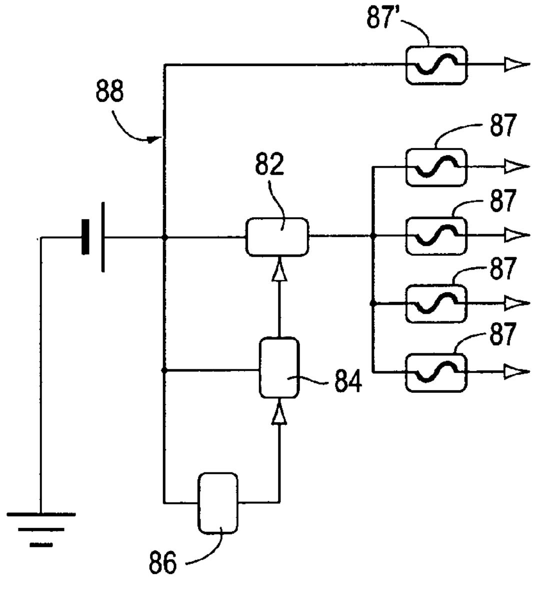
FIG. 8 is a block diagram illustrating yet another embodiment of this invention wherein certain portions of the vehicle electrical system remain powered following general power interruption.

As shown in FIG. 8, the vehicle electrical system input, in addition to the starter and alternator connections, typically comprises one or more fused circuits 87 all connected to the battery. In the embodiment shown in FIG. 8, in addition to the cutoff switch 82, control 84 and sensor 86, there is also provided a bypass circuit 88, bypassing the cutoff switch 82. This bypass circuit is used to connect certain parts of the vehicle electrical system to the battery and maintain power to such selected systems even when switch 82 has interrupted the main battery connection.

Preferably the bypass circuit 88 connects selected systems through the fused circuit 87', by isolating particular fused inputs from the main power supply line and bringing a new connection to these fused inputs directly from the battery terminal, bypassing the cutoff switch. The selected circuits are preferably the circuits controlling the door latches and the electrical window drives where there are such features. In a further preferred embodiment, the selected circuits may include a communication circuit such as “On Star”.

There are several different locations in which the cutoff switch could be located on or near battery 4. None of these locations are preferred over one another, but are merely alternative embodiments of the same invention which all function approximately equally. However as a general rule it is preferred that the distance between the switch and the battery terminal be kept as short as practical so as to minimize the length of wiring that remains active (i.e. still connected to the battery) following activation of the cutoff circuit. Thus mounting of the cutoff switch on the battery casing itself, as shown in FIGS. 1-4 offers distinct advantages and is, therefore preferred. Additionally packaging both the shock sensor and the cutoff control and latching switch together as a single unit 90 and mounting the unit on the battery casing, as shown in FIG. 1, is preferred.

It is to be understood that numerous variations of the above described circuits may be used to implement this invention, and provide power interruption upon detection of a shock exceeding a particular magnitude. Having described the invention, we now claim the following and their equivalents.

What is claimed is:

1. A cutoff circuit for disconnecting a battery powering a vehicle electrical system from said electrical system, the vehicle electrical system comprising an electrical input and an electrical ground, the battery comprising a first terminal electrically connected to said input and a second terminal electrically connected to said ground, the battery cutoff circuit comprising:

(a) a shock detector mounted on said vehicle adapted to provide a command upon detection of a predetermined impact force having a magnitude in excess of 50 lbs on said vehicle, (b) a latching cutoff switch interposed between said battery first terminal and said vehicle electrical system wherein said cutoff switch comprises a control device for switching said latching cutoff switch from a first latched state wherein said latching cutoff switch connects said battery first terminal to said electrical input to a second latched state wherein said latching cutoff switch disconnects said battery first terminal from said electrical input upon receipt of said command from said shock detector;

wherein:

(a) selected portions of said vehicle electrical system are directly connected to said battery first terminal bypassing said cut off switch; and (b) the shock detector and said latching cutoff switch are both mounted adjacent said battery.

2. The cutoff circuit in accordance with claim 1 wherein said latching cutoff switch is a two position electrically actuated mechanical latching switch and includes a reset actuator.

3. The cutoff circuit according to claim 1 wherein said shock detector and said latching cutoff switch are packaged in a single enclosure and said enclosure is mounted adjacent said battery.

4. The cutoff circuit according to claim 3 wherein said enclosure is mounted on said battery.

5. The cutoff circuit according to claim 1 wherein said electrical input comprises a fused power distribution circuit.

6. The cutoff circuit according to claim 5 wherein said fused power distribution circuit comprises a plurality of fuses, each having a fuse input side connected to said battery and a fuse output side connected to said vehicle electrical system and wherein at least one of said fuse inputs is isolated from any other fuse input and is connected directly to said battery bypassing said cutoff switch.

* * * * *